March 31, 1970 C. F. CROMER ET AL 3,504,281
CURRENT RESPONSIVE APPARATUS FOR A HIGH VOLTAGE CONDUCTOR
WHEREIN DISPLACEMENTS RESPONSIVE TO CURRENT VARIATIONS
ARE TRANSFORMED INTO FORCES WHICH ARE TRANSMITTED TO A
REMOTE POINT AND FORCE TRANSDUCER APPARATUS
Filed Oct. 14, 1964
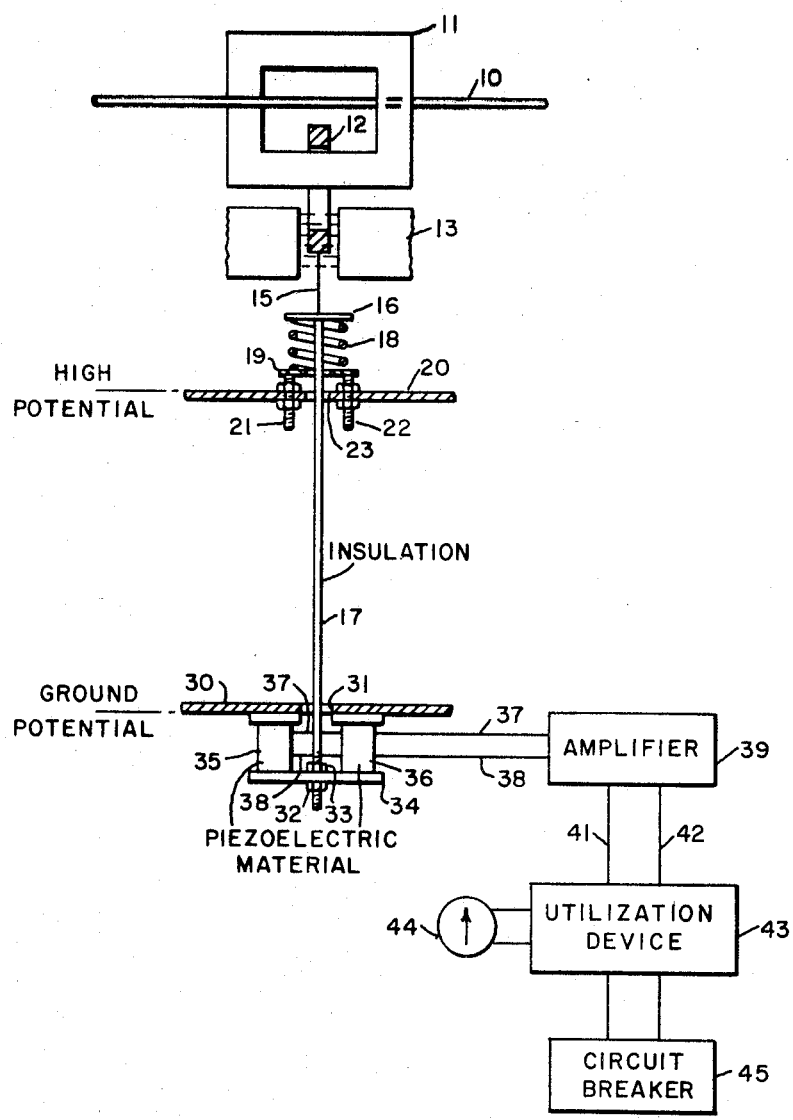
WITNESSES
INVENTORS
Charles F. Cromer and
Robert R. Circle
BY
ATTORNEY United States Patent Office 3,504,281
Patented Mar. 31, 1970

3,504,281
CURRENT RESPONSIVE APPARATUS FOR A HIGH VOLTAGE CONDUCTOR WHEREIN DISPLACEMENTS RESPONSIVE TO CURRENT VARIATIONS ARE TRANSFORMED INTO FORCES WHICH ARE TRANSMITTED TO A REMOTE POINT AND FORCE TRANSDUCER APPARATUS
Charles F. Cromer, Trafford, Pa., and Robert R. Circle, Fairfax, Va., assignors to Westinghouse Electric Corporation, East Pittsburgh, Pa., a corporation of Pennsylvania
Filed Oct. 14, 1964, Ser. No. 403,808
Int. Cl. G01r 19/06
U.S. Cl. 324—127
6 Claims

ABSTRACT OF THE DISCLOSURE

Magnetic means at the conductor include means tending to normally create displacements in a displaceable element which vary with variations in the current in the conductor, the displaceable element being coupled to a rod having a carefully selected stiffness, and spring damping means near the conductor coupled to the rod and the displaceable element for transforming displacing forces on the displaceable element into forces on the rod. At the receiving end a piezoelectric element or elements connected to have their signals additive have variable forces applied thereto by the end of the rod adjacent thereto, which undergoes no substantial displacement. Utilization circuit means may include a current indicator and amplifier means, or circuit interrupting means.

---

This invention relates to improvements in current responsive apparatus especially suitable for monitoring or measuring the current in a high voltage conductor, and more particularly to improved current monitoring apparatus having means at the line for generating a force proportional to the current in the conductor, and means for transmitting the force to a transducer located at ground potential.

As will be readily understood by those skilled in the art, as the potential of a high voltage conductor increases, the cost of insulating a current transformer for the maximum peak or transient potential which might be encountered increases and ultimately may become prohibitive. This is especially true of, for example, current transformers for "hot tank" type of circuit breakers.

The apparatus of our invention eliminates the necessity for the high voltage insulation of a conventional current transformer. Whereas as the idea of obtaining variable displacement of a movable element near a conductor proportional to variations in the current in the conductor, transmitting the displacement substantially undiminished by a rod of insulating material to a remote point, and utilizing the displacement of the rod at the remote point to obtain a signal, as by the use of a coil mounted on the rod and moving in a magnetic field, has been advanced heretofore, this arrangement is sometimes impractical and is sometimes characterized by a long time delay which requires extensive phase shifting, and by undesirable resonances in the rod and undesirable harmonics in the output signal requiring extensive filtering.

In the instant invention we eliminate the necessity for substantial displacement of a movable element in our system at either the conductor end of the transducer end of a force transmitting rod or other device. At the low potential end or "ground" end of the rod, we employ a piezoelectric transducer which can have the stress thereon varied within a sufficiently wide limit to produce an optimum signal by infinitesimal "displacement" of a pressure electrode in the order of a fraction of a millimeter, which is the maximum possible displacement. In effect, our system is fixed at the ground end.

At the conductor end, we provide a movable armature which has a current therein proportional to the line current and which is adapted to undergo translatory motion in a permanent magnetic field in two directions, toward and away from the transducer, or more precisely, toward and away from the direction in which force is to be transmitted, but while a variable force is applied to the armature as a result of the interaction of the current and the magnetic field which tends to move the armature, biasing forces continuously applied to the armature in both directions by a spring and by the resiliency of the connecting rod prevent substantial movement or substantial displacement resulting from the interaction of the current and the magnetic field. A connecting rod of relatively small resiliency connects the armature to the piezoelectric element and transmits the force thereto without substantial motion.

As a result, our apparatus is substantially free from undesirable resonances, and the transducer signal output is substantially free from harmonics. Whereas the prior art device is not practical, our device is completely practical and useful.

Accordingly, a primary object of the invention is to provide new and improved current responsive apparatus for a high voltage conductor offering advantages over any now existing in the art.

A further object is to provide new and improved current responsive apparatus utilizing means at the line for obtaining a varying force which varies with variations in the current in the line.

Another object is to provide new and improved current responsive apparatus in which a variable force developed at the high voltage line and varying with variations in the current in the high voltage conductor, is transmitted by an insulating tension member to transducer apparatus at ground potential, the transducer apparatus providing a signal which is proportional to the current flowing in the high voltage conductor.

These and other objects will become more clearly apparent after a study of the following specification, when read in connection with the accompanying drawing, in which the single figure thereof represents the current responsive apparatus according to the preferred embodiment of our invention.

In the drawing, the reference numeral 10 designates a high voltage conductor carrying an alternating current. Disposed around the conductor 10 is a ferromagnetic core 11, which may be laminated, and passing around or through the core 11 is a movable armature 12 which may consist of a single turn of low resistivity copper. Means for setting up a magnetic field, for example a permanent magnet, is shown at 13, the armature passing through the magnetic field, so that current flowing in the armature and reacting with the magnetic field will tend to cause the armature to move and undergo translatory motion in a line substantially perpendicular to the magnetic field and which in the illustration is also substantially perpendicular to the conductor. Armature 12 is operatively connected by a solid supporting rod 15 to a pressure head or pressure disc 16 which in addition to being permanently secured to the rod 15 is permanently secured to one end of an elongated tension member or rod 17 composed of insulating material. Abutting against the pressure disc 16 is one end of a coiled spring 18, the other end of the coiled spring 18 abutting against and being fastened to an annular ring support member 19 having a central aperture through which freely passes the aforementioned insulating rod member 17. The support ring 19 is secured to any suitable housing means 20 as by bolts 21 and 22, and it is seen that the housing 20 has an aperture 23 therein through which passes the insulating rod 17. The threaded bolts supporting member 19, including bolts 21 and 22, have nuts on both sides of housing wall 20 so that the tension of spring 18 can be adjusted. The housing 20 and the remainder of the structure shown above wall 20 in the figure may all be at high potential, and it is understood that the housing 20 may be mounted on the high voltage conductor 10 and may be at the potential of the high voltage conductor.

Housing 20 may be mounted on a high voltage bushing, not shown for convenience of illustration, and rod 17 may extend the length of the bushing through a central bore therethrough.

At the ground end, or at the position of ground or low potential, of the tension rod 17, there is a supporting member 30 having an aperture 31 therein through which passes the aforementioned insulating rod 17. The end of the rod 17 is secured by nuts 32 and 33 to a pressure member 34 which abuts against and applies pressure to a pair of piezoelectric elements 35 and 36. The piezoelectric elements 35 and 36 are shown electrically connected in parallel, but they could be connected in series if desired, or the elements may if desired be replaced by a single piezoelectric element, the connection being immaterial so long as the signals generated in the piezoelectric elements add to produce the optimum output signal obtainable therefrom. Leads 37 and 38 supply an input to an amplifier 39 which preferably has a high input impedance, and the output of the amplifier 39 is applied by the leads 41 and 42 to a utilization device 43. The utilization device 43 may have a meter 44 calibrated in values of the current in the high voltage conductor 10; device 43 may be a relay with means for giving a warning or performing other functions when the current in the high voltage conductor 10 indicates the presence of a fault or abnormal transient therein, or the device 43 may be connected to control circuit breaker apparatus 45.

In the operation of the apparatus, the spring 18, in the absence of any current in conductor 10, normally maintains a tension on the piezoelectric elements 35 and 36, transmitted thereto by the insulating rod 17. The spring 18 provides a continuous biasing force on armature 12. The resiliency of rod 17 provides a continuous biasing force on armature 12 in the opposite direction. As previously stated, the armature 12 tends to move up and down in accordance with variations in the current in conductor 10, but is restrained by the biasing forces, and the force generated by the interaction of the armature current and magnetic field is transmitted by rod 17 to the piezoelectric material, varying the stress on the piezoelectric elements 35 and 36 and causing a signal to be generated thereby, which signal, amplified at 39, is used by the utilization device 43 as aforementioned.

Preferably the piezoelectric material of elements 35 and 36 is a lead-zirconate-titanate ceramic known in the trade as PZT, or some similar composition having suitable characteristics.

With respect to the stiffness of the connecting rod 17, as previously stated the rod itself applies a biasing force to the armature in one of said directions, so that the material of the rod is carefully chosen to provide a sufficiently high modulus of elasticity to suppress harmonics, and the cross-section of the rod is carefully chosen so that the rod can be stretched slightly when it is connected between the piezoelectric elements, or transducer, and the armature to provide a biasing force in one direction on the armature, while at the same time having sufficient stiffness to transmit force from the armature to the piezoelectric element.

In summary, we essentially transform a displacement at the line into a variable force by the use of resilient biasing means connected to the movable element. Our invention includes but is not limited to a movable armature; the armature, which may consist of a single turn of low resistivity copper, is linked by an iron core which also links the high voltage conductor carrying the current. Means for producing a magnetic field is disposed near the armature, which passes through the magnetic field. The armature current, reacting with the magnetic field, produces a varying force on the armature proportional to the line current, and this force is transmitted to suitable transducer apparatus, a piezoelectric element, by an elongated insulating tension member. The insulating tension member is spring biased to provide a biasing force at all times on the piezoelectric element. The biasing spring is designed so that for all conditions of temperature and humidity and fault current there is always a compressive force applied to the piezoelectric element. The output voltage of the piezoelectric element is a function of the force applied to it, and accordingly the voltage varies with variations in the current in the high voltage conductor. This output is fed to a high impedance amplifier, the output of which is proportional to the current flowing in the high voltage conductor, and the output signal of the high impedance amplifier may be used for monitoring, for circuit control, for metering and indicating the value of the current, and for other purposes.

Rod 17 may be thought of as a static element.

Other suitable transducers may be employed in our apparatus as well as a transducer composed of piezoelectric material.

The invention includes the use of an armature, spring, and other parts so proportioned and of such mass that rod 17 is responsive to instantaneous variations in current over the alternating current cycle.

Whereas we have shown two piezoelectric elements 35 and 36, one cylindrical piezoelectric element could be employed.

Whereas we have shown and described our invention with respect to an embodiment thereof which gives satisfactory results, it should be understood that changes may be made and equivalents substituted without departing from the spirit and scope of the invention.

We claim as our invention:

1. A force generating, force transmitting, and force utilizing system comprising in combination, means adapted to be mounted near a high voltage alternating current conductor including a magnetic field generating element and a current carrying element located at least partially in said magnetic field, the means being constructed and arranged whereby the current carrying element tends to be displaced from the position which it would normally occupy in the absence of any current in the conductor in varying amounts in accordance with instantaneous changes in the value of the current in the conductor during each alternation and in two opposite directions in accordance with changes of the polarity and direction of current flow in the conductor at the end of each alternation, elongated force transmitting means having one end thereof operatively connected to the current carrying element, transducer means secured in position at a remote point, the transducer means including a nearly rigid element secured to the other end of the force transmitting means, the transducer means having at least one piezoelectric element mounted against the nearly rigid element whereby vibrations of the nearly rigid element are transmitted to the piezoelectric element, the piezoelectric element having a pair of electrodes thereon for obtaining an electrical signal therefrom resulting from vibrations of the nearly rigid element transmitted to the piezoelectric element, and spring biasing means located near the conductor and operatively connected to the force transmitting means near the adjacent end thereof, said biasing means transforming forces which would tend to displace the current carrying element into forces applied to the end of the force transmitting means, said biasing means preventing vibrations of the nearly rigid element from causing displacement of said current carrying member.

2. A system according to claim 1 wherein the force transmitted means is a rod having at least a portion thereof composed of electrically insulating material, said material having a selected modulus of elasticity whereby no periodically varying force corresponding in frequency to a harmonic of the frequency of the alternating current in the conductor is substantially transmitted to the transducer means.

3. A system according to claim 1 wherein the force transmitting means is a rod having a preselected length and cross-section and a preselected modulus of elasticity whereby the rod is stretched by the force of the spring biasing means, said rod having at the same time sufficient stiffness to transmit force from said current carrying element near the conductor to the nearly rigid element of the transducer means.

4. A system according to claim 1 including in addition utilization means connected to the pair of electrodes of the piezoelectric element and having the electrical signal applied thereto.

5. A system according to claim 1 including a second piezoelectric element in the transducer means having a pair of electrodes, the second piezoelectric element being mounted against the nearly rigid element whereby vibrations of the nearly rigid element are transmitted to the second piezoelectric element, the electrodes of the first-named piezoelectric element being connected in parallel with the electrodes of the second piezoelectric element in a manner whereby the signals generated by the first-named and second piezoelectric elements are of the same polarity and substantially in phase with each other.

6. In current responsive apparatus for use with a conductor carrying alternating current, in combination, a core composed of ferromagnetic material enclosing the conductor and spaced therefrom, the core lying in a plane substantially perpendicular to the conductor whereby current in the conductor generates magnetic flux in the core, a movable armature linking said core and composed of electrically conductive material whereby variations in the magnetic flux in the core produce a varying current in the armature, permanent magnet means having a gap therein, the peripheral portion of the armature oppositely disposed to that peripheral portion which links said core being disposed in said gap, the magnetic field in said gap creating a variable force on said armature as the current in the armature varies, rod means having first and second portions, the first portion having the end thereof secured to the armature, a disc secured to the first portion and extending transversely thereto, spring biasing means, means mounting and securing one end of the spring biasing means in fixed position, the other end of the spring biasing means abutting against said disc and exerting a biasing force thereon, the second portion of the rod means being composed of electrically insulating material, the spring biasing means biasing the armature and rod means against displacement and transforming the forces exerted on the current carrying armature by the magnetic field in said gap which would tend to displace the armature into variations in force on the adjacent end of the rod means, the insulating second portion of the rod means having a sufficiently large modulus of elasticity to suppress harmonics of a frequency greater than the frequency of the alternating current in the conductor, the insulating second portion of the rod means extending to a remote point, and transducer means at the remote point having the adjacent end of the rod means secured thereto for substantially fixing said last-named end against displacement while utilizing variations in the force transmitted to the transducer means to generate a signal which varies with variations in the current in the conductor.

References Cited

UNITED STATES PATENTS

| 2,661,622 | 12/1953 | Severs | 73—71.4 |
| 2,402,544 | 6/1946 | Foulds | 324—127 XR |
| 2,917,642 | 12/1959 | Wright et al. | 310—8.3 |
| 3,064,238 | 11/1962 | Newberry et al. | 340—164 XR |
| 3,331,023 | 7/1967 | Adkins et al. | 324—127 |

GERARD R. STRECKER, Primary Examiner

U.S. Cl. X.R.

317—144; 324—109